United States Patent
Paraskevakos

(10) Patent No.: US 7,806,132 B2
(45) Date of Patent: Oct. 5, 2010

(54) METHOD AND DEVICE FOR TAPPING A PIPELINE

(75) Inventor: Theodore G. Paraskevakos, Towson, MD (US)

(73) Assignee: Tippmann Sports, LLC, Fort Wayne, IN (US)

( * ) Notice: Subject to any disclaimer, the term of this patent is extended or adjusted under 35 U.S.C. 154(b) by 831 days.

(21) Appl. No.: 11/678,744

(22) Filed: Feb. 26, 2007

(65) Prior Publication Data

US 2007/0235079 A1 Oct. 11, 2007

Related U.S. Application Data

(60) Provisional application No. 60/776,204, filed on Feb. 24, 2006.

(51) Int. Cl.
*B23B 41/08* (2006.01)
(52) U.S. Cl. .................... 137/15.08; 137/269; 137/323; 137/460; 137/551
(58) Field of Classification Search ......... 137/269–271, 137/323, 317, 15.08, 15.01, 551, 460
See application file for complete search history.

(56) References Cited

U.S. PATENT DOCUMENTS

| | | | |
|---|---|---|---|
| 303,021 A * | 8/1884 | Kennedy | 137/271 |
| 3,107,082 A * | 10/1963 | Reynolds | 137/269 |
| 3,727,003 A | 4/1973 | Paraskevakos | |
| 3,812,296 A | 5/1974 | Paraskevakos | |
| 4,250,920 A * | 2/1981 | Traylor | 137/269 |
| 4,889,367 A | 12/1989 | Miller | 283/88 |
| 5,143,257 A * | 9/1992 | Austin et al. | 222/57 |
| 5,152,503 A * | 10/1992 | Conway | 137/271 |
| 5,497,990 A | 3/1996 | Nanni | 273/138 A |
| 5,616,902 A | 4/1997 | Cooley et al. | 235/380 |
| 6,065,672 A | 5/2000 | Haycock | 235/379 |
| 6,109,522 A | 8/2000 | Force et al. | 235/379 |
| 6,131,718 A | 10/2000 | Witschorik | 194/206 |
| 6,145,738 A | 11/2000 | Stinson et al. | 235/379 |
| 6,237,739 B1 | 5/2001 | Mazur et al. | 194/207 |
| 6,317,650 B1 | 11/2001 | Powell et al. | 700/236 |
| 6,550,671 B1 | 4/2003 | Brown et al. | 235/379 |
| 6,603,871 B2 | 8/2003 | Liang | 382/135 |
| 6,661,910 B2 | 12/2003 | Jones et al. | 382/135 |
| 6,761,184 B1 * | 7/2004 | Jordan | 137/238 |
| 6,783,061 B2 | 8/2004 | Graef et al. | 235/379 |
| 7,006,664 B2 | 2/2006 | Paraskevakos | 382/100 |
| 7,454,049 B2 | 11/2008 | Paraskevakos | 382/135 |
| 7,567,698 B2 | 7/2009 | Paraskevakos | 382/135 |
| 7,724,938 B2 | 5/2010 | Pareskevakos | |
| 2002/0194124 A1 | 12/2002 | Hobbs et al. | 705/39 |
| 2003/0059098 A1 | 3/2003 | Jones et al. | |
| 2003/0210386 A1 | 11/2003 | Laskowski | 356/71 |

(Continued)

*Primary Examiner*—Kevin L Lee
(74) *Attorney, Agent, or Firm*—Pillsbury Winthrop Shaw Pittman LLP

(57) ABSTRACT

A method and device is provided for tapping an existing primary pipeline (e.g., a water supply line) without cutting the existing primary pipeline. A secondary supply line may be installed by coupling the device to a valve of the existing pipeline. In various implementations, the device may have a single port serving as both an input (i.e., an inlet) and an output (i.e., an outlet). Among other advantages, the invention may be used to avoid costly procedures of cutting supply lines, to prevent water spillage, to integrate with existing alarm and home improvement systems, and to communicate wirelessly with utility companies for billing purposes.

28 Claims, 8 Drawing Sheets

U.S. PATENT DOCUMENTS

| | | |
|---|---|---|
| 2004/0222283 A1 | 11/2004 | Mastie et al. |
| 2004/0232217 A1 | 11/2004 | Graef et al. ................. 235/379 |
| 2004/0255354 A1 | 12/2004 | Graef et al. .................... 902/8 |
| 2009/0148027 A1 | 6/2009 | Paraskevakos .............. 382/135 |

* cited by examiner

CUT B--B

CUT A--A

1/2 INCH STOP WATER VALVE WITHOUT THE MECHANISM

METHOD AND DEVICE FOR TAPPING A PIPELINE

RELATED PATENTS AND PATENT APPLICATIONS

This application claims the benefit of provisional U.S. patent application Ser. No. 60/776,204, entitled "Method and Device for Tapping a Pipeline," filed Feb. 24, 2006, which is hereby incorporated by reference in its entirety.

This application is related to commonly owned Greek patents, GR 1004852, issued Apr. 12, 2005, and GR 1004981, issued Sep. 9, 2005, both of which are hereby incorporated by reference in their entirety.

FIELD OF THE INVENTION

The present invention relates to tapping pipelines in plumbing systems, and more particularly, to creating a secondary supply without severing existing primary supply pipes.

BACKGROUND OF THE INVENTION

In existing plumbing systems, adding a new supply line is a difficult and cumbersome process. In most instances, when a new supply line is added for any purpose, existing lines must inevitably be cut, and a "T" tap must be installed in series, and a control valve must be added for the new supply line. Cutting lines and installing taps or valves in an existing line, however, often requires skillful, time consuming, and costly labor.

Existing systems suffer from these and other problems.

SUMMARY OF THE INVENTION

According to various aspects and implementations of the invention, a method and device for tapping a pipeline may address these and other drawbacks of existing systems. Among other things, the method and device may be coupled to a valve of an existing pipeline (e.g., a water supply line) to provide a secondary supply line. In various implementations, the device may include a single port serving as both an input (i.e., an inlet) and an output (i.e., an outlet). As such, a secondary supply line may be created without severing the existing primary pipeline. Among other advantages over existing systems, the method and device of the invention may avoid costly procedures of cutting supply lines, prevent water spillage, integrate with existing alarm and home improvement systems with low installation and operating costs, and communicate wirelessly with a utility company for billing purposes.

Other objects and advantages of the invention will be apparent to those skilled in the art based on the following drawings and detailed description.

DETAILED DESCRIPTION

Figure 1:
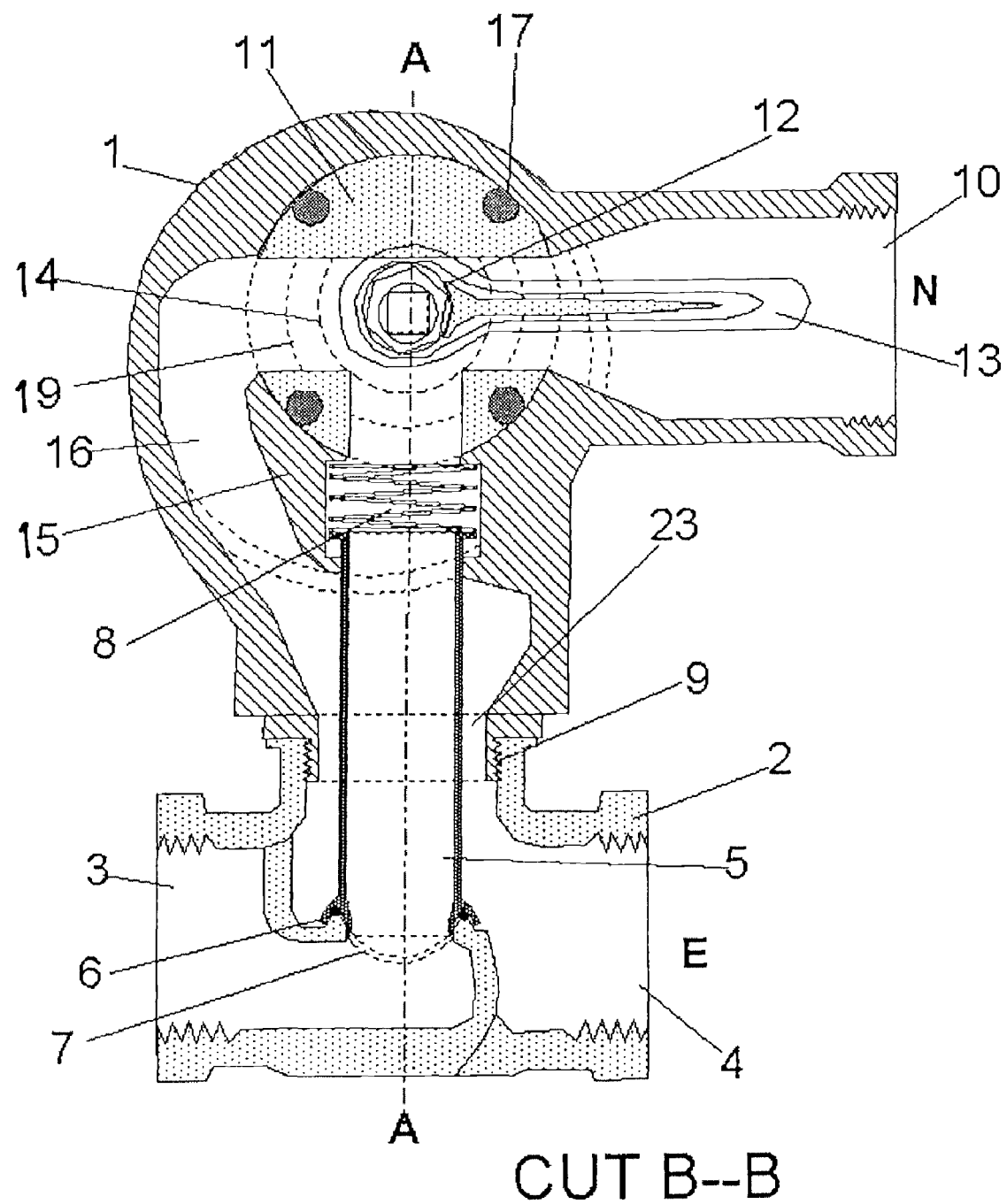
FIG. 1 illustrates a cross-sectional schematic diagram of an exemplary tapping device, according to various aspects of the invention.

Referring to FIG. 1, an exemplary tapping device 1 is illustrated. Tapping device 1, which can be constructed using any suitable material (e.g., bronze, copper, plastic, etc.), may be configured to be screwed into existing threads 9 coupled to a valve base 2. A process of installing tapping device 1 into an existing pipe may include stopping flow within the pipe, emptying the pipe of any fluid contained therein, and removing an on-off mechanism of valve 2 coupled to the pipe. It will be apparent, however, that many other approaches and designs may be used to achieve similar results without departing from the scope and spirit of the invention.

To avoid severing an existing supply line, various aspects and implementations of the invention may include using, among other things, a stop valve of the existing supply line. It will be apparent, however, that other types of valve (e.g., gate valves, ball valves, etc.) can be suitably substituted. Further, in a new installation, a modified stop valve can be used. For instance, as shown in FIG. 1, removing an on-off mechanism of an existing valve may leave a valve base 2 having a distinct input 3 and output 4.

Tapping device 1 may include a pipe 5 of an appropriate size, constructed from any suitably thin material (e.g., brass). In the illustrated example, pipe 5 has an extension O-ring 6, which seals an opening of valve base 2. In this end of pipe 5, a net 7 may be installed, where net 7 may be made of any material suitable for straining flow (e.g., of water) and removing debris, thereby protecting other device mechanisms. Further, in the illustrated example, the other end of pipe 5 may include a spring 8, which may push pipe 5 into a secure position. Device 1 may also include a cylinder 11 having a T-shaped hole 14 that can be rotated 360° around an axle 12 with the assistance of a handle 13. Cylinder 11 may include four holes (i.e., channels) across a periphery, in which plastic cylinders 17 may be disposed to keep device 1 watertight. Further, another O-ring 19 may be implanted in the base of cylinder 11 to keep device 1 even more watertight. Watertightness may be achieved by constructing O-ring 19 and rods 17 of plastic or any suitably similar material. It will also be apparent that cylinder 11 may be configured or designed using other suitable shapes (e.g., spherical), without departing from the scope and spirit of the invention.

As shown in FIG. 1, flow (e.g., water) may enter valve base 2 through input 3, pass through strainer 7, pipe 5, and T-shaped hole 14, before exiting through an output 10, as marked by reference character N ("New Exit"). Furthermore, from hole 14, flow may also pass through a path 16, which goes around pipe 5 and back through a passage 23, and subsequently exit through output 4, as marked by reference character E ("Existing Exit").

Figure 2:
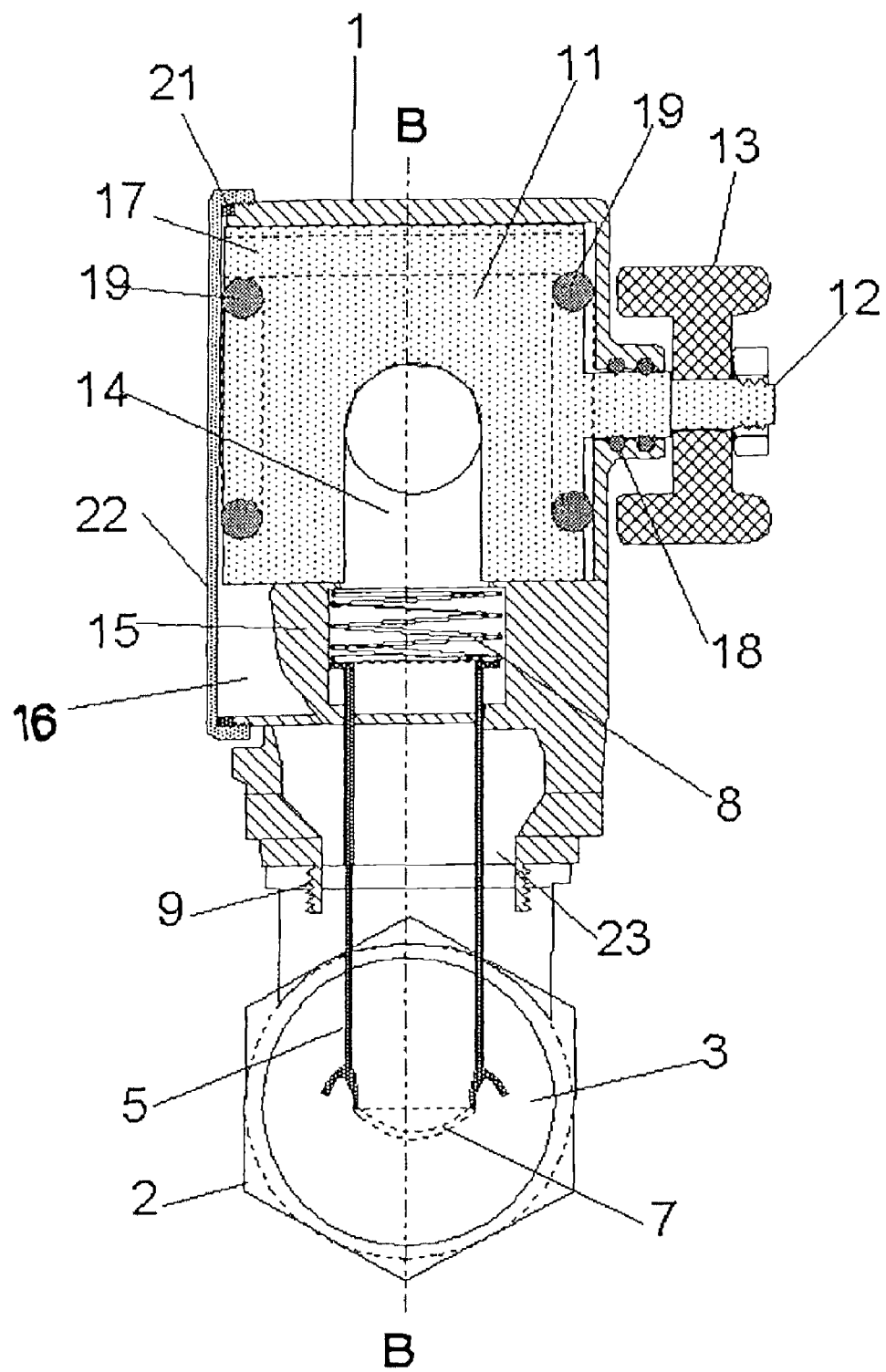
FIG. 2 illustrates a cross-sectional schematic diagram of the tapping device shown in FIG. 1, taken along line A-A, according to various aspects of the invention.

FIG. 2 illustrates a cross-sectional schematic diagram of device 1 along line A-A shown in FIG. 1. As shown, device 1 has an enclosure of cylindrical shape, which can be sealed watertight by screwing a round cover 22 until it is pressed tight against a gasket 21. Axle 12 of cylinder 11 may maintain its water tightness through O-rings 18. Furthermore, rotating handle 13 in different positions may controls flow, as shown and described in greater below.

Figure 3:
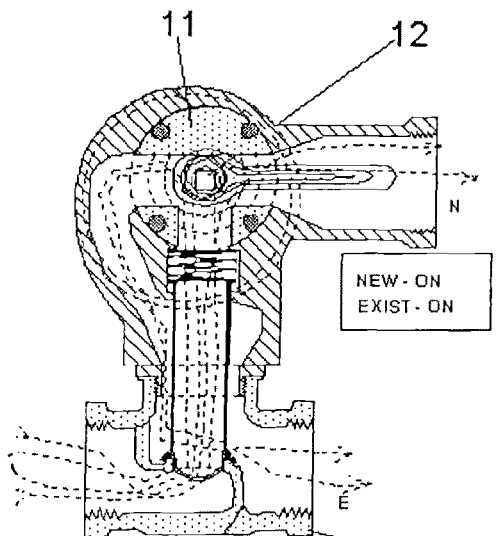
FIGS. 3 and 3a-c illustrate cross-sectional schematic diagrams of the tapping device shown in FIG. 1, operating in various modes to control water flow, according to various aspects of the invention.
Figure 3A:
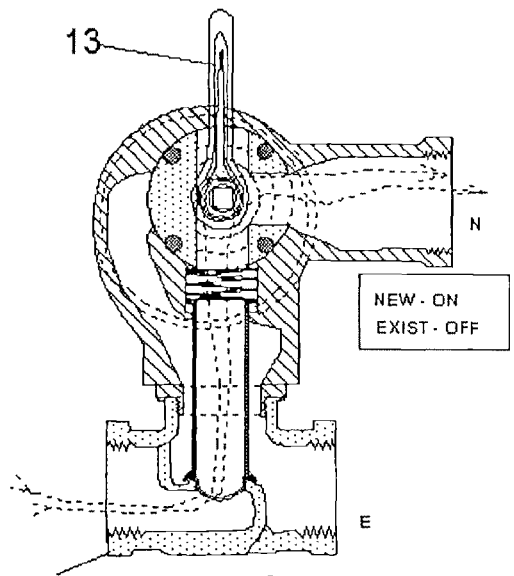
Figure 3B:
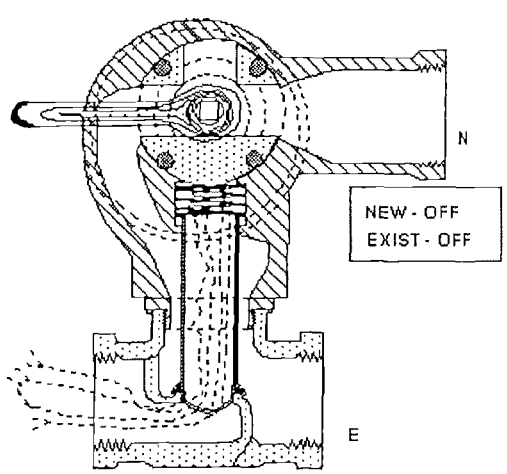
Figure 3C:
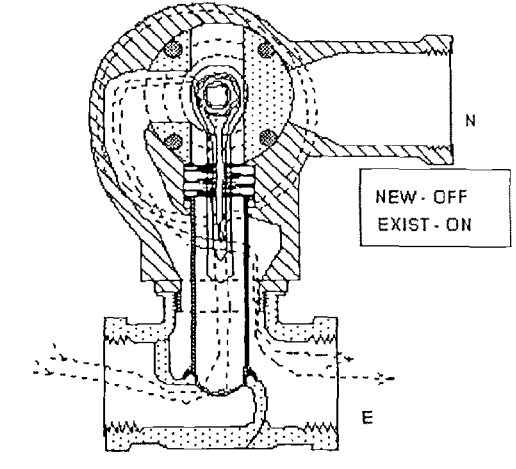

FIG. 3 illustrates an exemplary flow (e.g., water) through a system and exiting through both New and Existing Exit. By using handle 13 to turn cylinder 11 90°, however, as shown in FIG. 3*a*, flow may pass through New Exit only. Further, turning handle 13 another 90°, as shown in FIG. 3*b*, may stop flow from passing through either Exit. FIG. 3*c* depicts another 90° turn of handle 13, which results in flow being allowed to pass through Existing Exit only.

Figures 4, 4A:
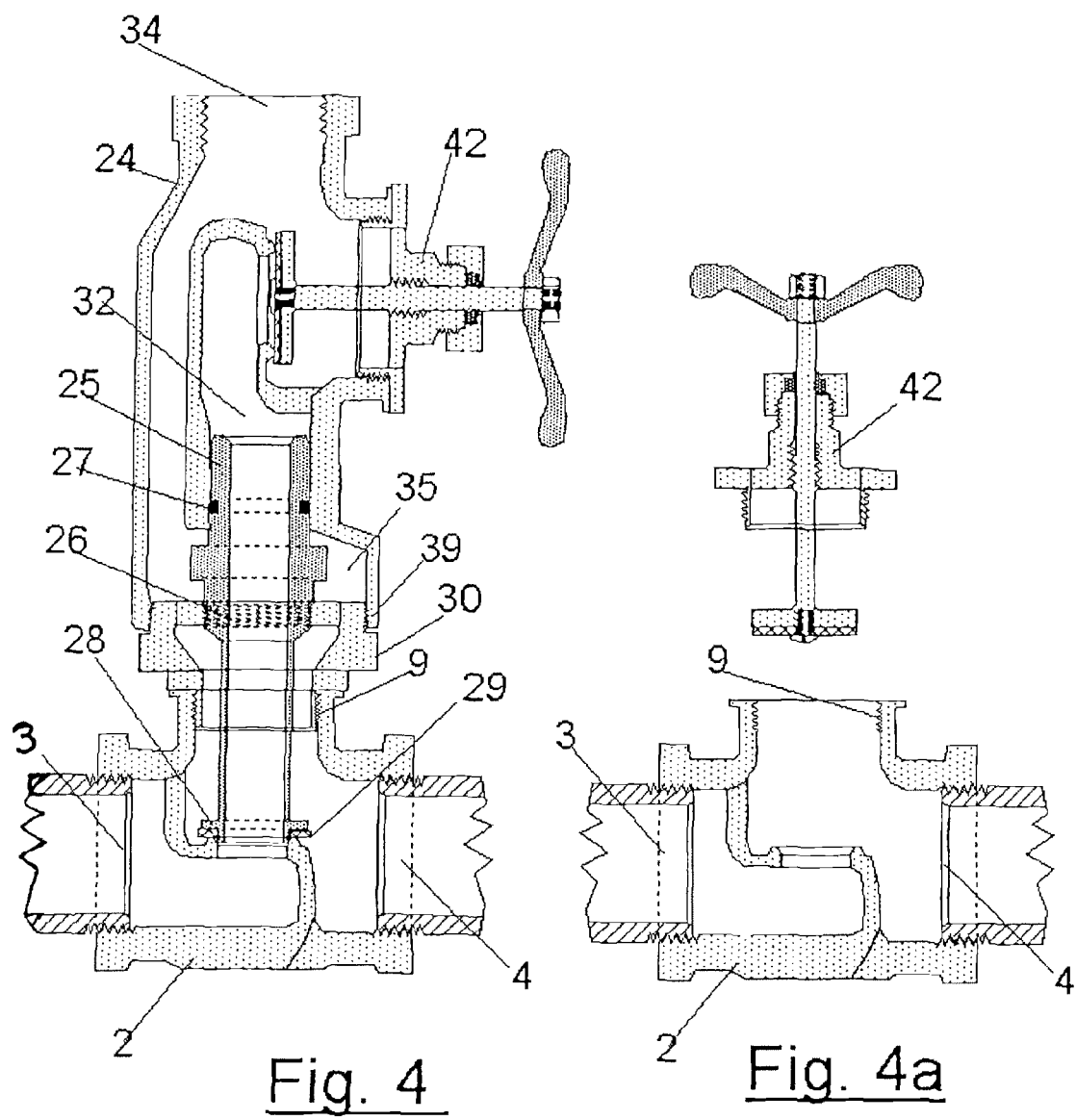
FIG. 4 illustrates a cross-sectional schematic diagram of an exemplary tapping device, according to various aspects of the invention.
FIG. 4a illustrates a cross-sectional schematic diagram of a stop valve, according to various aspects of the invention.

Referring to FIG. 4, a cross-sectional view of an exemplary tapping device having a T-shaped exit is illustrated according to various aspects of the invention. In the illustrated example, creating a secondary supply line 34 may include removing an existing stop mechanism 42 from existing stop valve 2 subsequent to stopping supply and emptying existing pipes, as shown in FIG. 4*a*.

Figure 5:
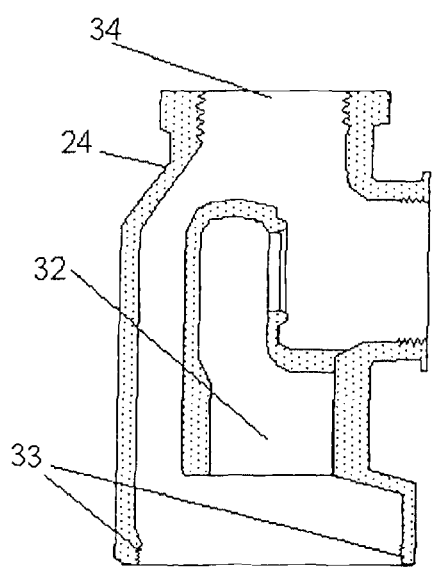
FIG. 5 illustrates a cross-sectional schematic diagram of a portion of the tapping device shown in FIG. 4, according to various aspects of the invention.
Figure 5A:
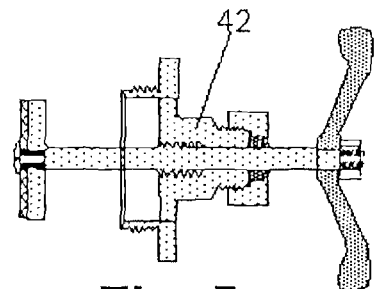
FIG. 5a illustrates a cross-sectional schematic diagram of a stop mechanism of the tapping device shown in FIG. 4, according to various aspects of the invention.
Figure 5B:
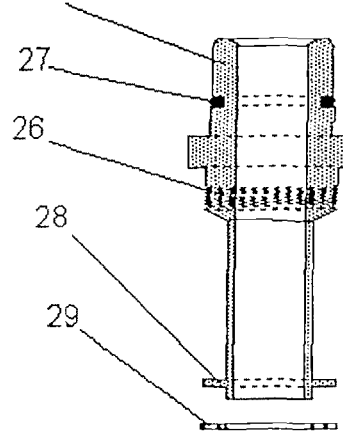
FIG. 5b illustrates a cross-sectional schematic diagram of an input, which may be used with the tapping device shown in FIG. 4, according to various aspects of the invention.
Figure 5C:
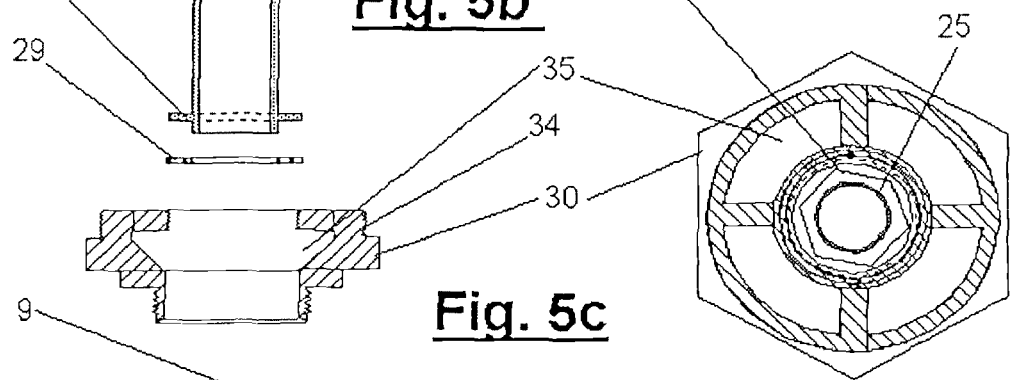
FIG. 5c illustrates a cross-sectional schematic diagram of a fastening adaptor, which may be used with the tapping device shown in FIG. 4, according to various aspects of the invention.
Figure 5D:
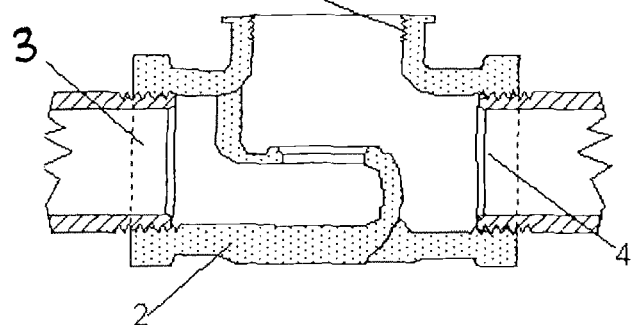
FIG. 5d illustrates a cross-sectional schematic diagram of a main stop valve, which may be used with the tapping device shown in FIG. 4, according to various aspects of the invention.

FIGS. 5 and 5*a-d* illustrate exploded views of FIG. 4. For example, FIG. 5*c* illustrates an adapter 30 fastened to an existing pipe opening. Adapter 30 may be fastened by installing an input pipe 25 through threads 26 and hex nut 37 until a gasket 29 (e.g., O-ring) is tightened securely within an input orifice of stop valve 2. Although pipe 25 may be located in a geometrical center of the device, when fastening part 24 through threads 26 to adapter 30, care should be taken so that O-ring 27 is inserted properly in a hole 32. The device is therefore fully installed once stop mechanism 42 is fastened into the proper position. After installation, flow passes through input 3 and pipe 25 before exiting through exit 34 and/or exit 4, depending on a configuration of mechanism 42. As a result, existing and new outlets can both be controlled using a single stop mechanism (i.e., stop mechanism 42).

Figure 6:
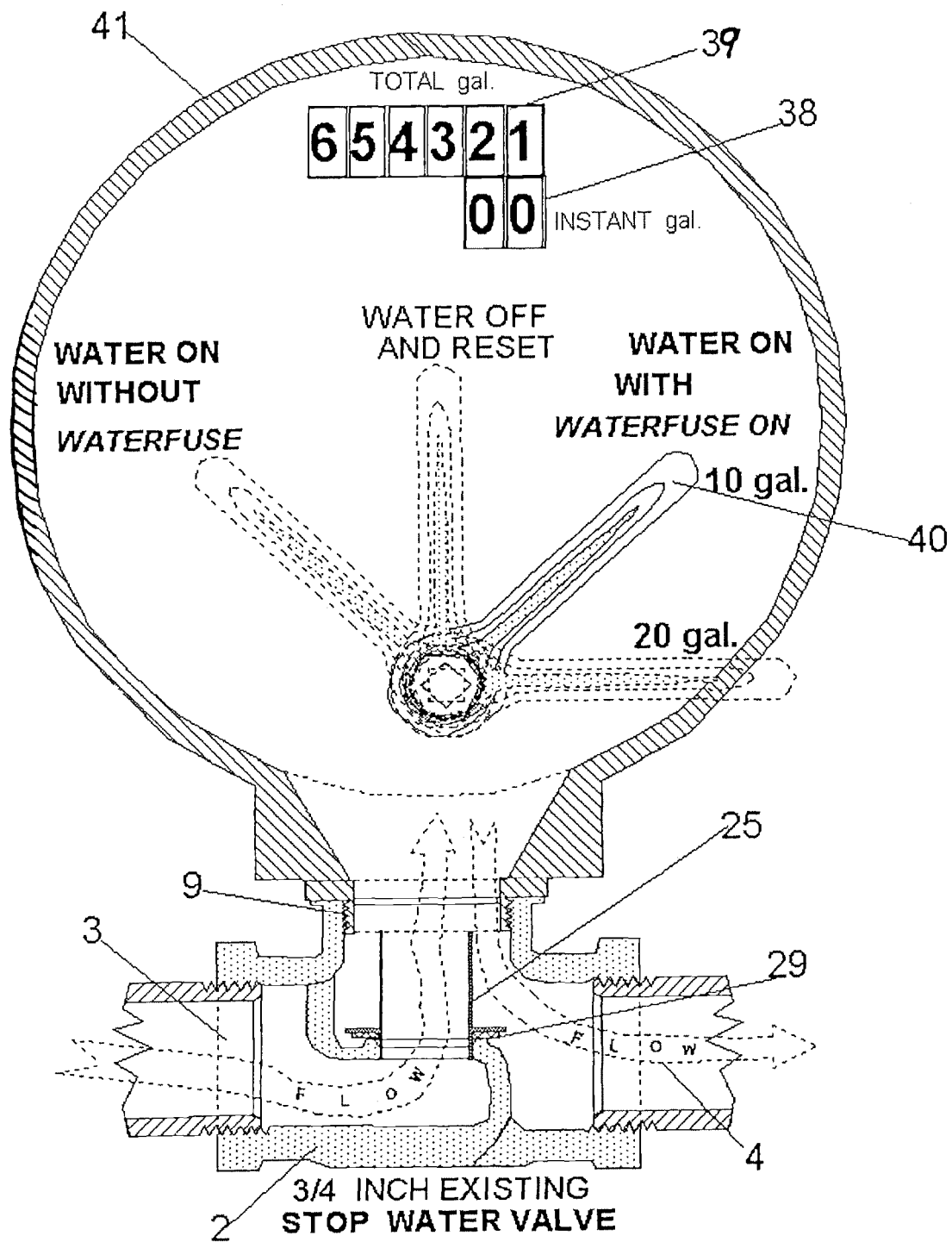
FIG. 6 illustrates a partial cross-sectional schematic diagram of a device installed in an existing water line, according to various aspects of the invention.

FIG. 6 illustrates another exemplary implementation of the invention, in which a device 41 may be installed into an existing water line. Illustrated device 41 may be a (e.g., Waterfuse). After stopping a system's water flow, draining the system, and unscrewing stop mechanism 42 of stop valve 2, device 41 may be fastened onto valve 2. Device 41 may have a handle, which can be turned in one of four positions. For instance, in a leftmost position, the system may perform similarly as before installation of device 41 (i.e., water flows through device 41 and exits without intervention). In a middle position, flow can be turned off, thus acting to reset device 41. In an intermediate right position, water may flow through device 41, and flow may be regulated to protect against water accidentally spilling ten or more gallons of water. In a rightmost position, device 41 can allow the supply of additional water without interruption. In various implementations, device 41 may be configured to limit water flow in various ways (e.g., as illustrated, a designated limit may be 20 gallons). Water flow may be regulated as it passes through input 3 and pipe 25, where flow may rotate an impeller to transfer measurable kinetic motion. Water may then flow around an exterior of pipe 25 and out exit 4.

Illustrated device 41 may prevent accidental water spillage by allowing passage of water as long as a total volume remains below a preset volume or limit of device 41. While the volume remains less than the limit, the system will be automatically reset, and a user may continue to consume as much water as desired in volumetric doses less than the preset limit. If the water reaches the limit, however, the system will close the exit and prevent water from accidentally spilling. Should this occur, the user can bypass the prevention mechanism by turning handle 40 into the middle position to reset the system, before subsequently returning handle 40 to one of the right positions (e.g., set to 10 and 20 gallon limits in the illustrated example), where prevention of accidental water spillage may continue.

As water passes through system 41, water flow may be measured and consumption may be displayed as instant consumption 38 or as total consumption 39. In various implementations, blades within the impeller may be constructed of ferrous magnetic material, such that a coil can be placed in an appropriate position to measure variations in a magnetic field, thus inducting energy during the impeller rotation. This energy may be enough to charge a 3-volt battery with a long life (e.g., lithium, metal hydride, or any other appropriate battery). The battery can then be used to operate a wireless transmitter such as a Blue Tooth™ transmitter, a Zigbee™ transmitter, or any other suitable transmitter, as will be apparent. In this way, device 41 can be part of a more sophisticated monitoring and control system. Further, systems equipped with this type of power generating component may eliminate a need to change batteries. The system can also be used as a component in a meter reading application (e.g., measuring gas, water, or other consumption).

By utilizing a base 2 of an existing stop valve, installing the system may be less demanding, in terms of both time and skill. In general, valves may easily accessible, such that they can be identified even by unskilled persons. Further, a valve having a multi-position switch may enable a user to maintain complete control over both main and auxiliary supplies. By contrast, were the valve to be replaced with a simple "T" tap, a user would not have any control over supplies.

Further, in various implementations, consideration may be taken to ensure that a cross-sectional area of pipe 5 (as shown in FIG. 1) and pipe 25 (as shown in FIG. 6) is almost equal to a cross-sectional area of spaces 23 and 35, respectively, around pipes 5 and 25, such that the user may not experience a reduction in water supply pressure. However, the invention has further applicability to new installations, in addition to being suitable for use with existing pipelines. For instance, new installations can use a base 2 with a more appropriate cross-section, so that water flow can be more evenly accommodated, without having to change dimensional standards, which many plumbers may be used to handling.

Figure 7:
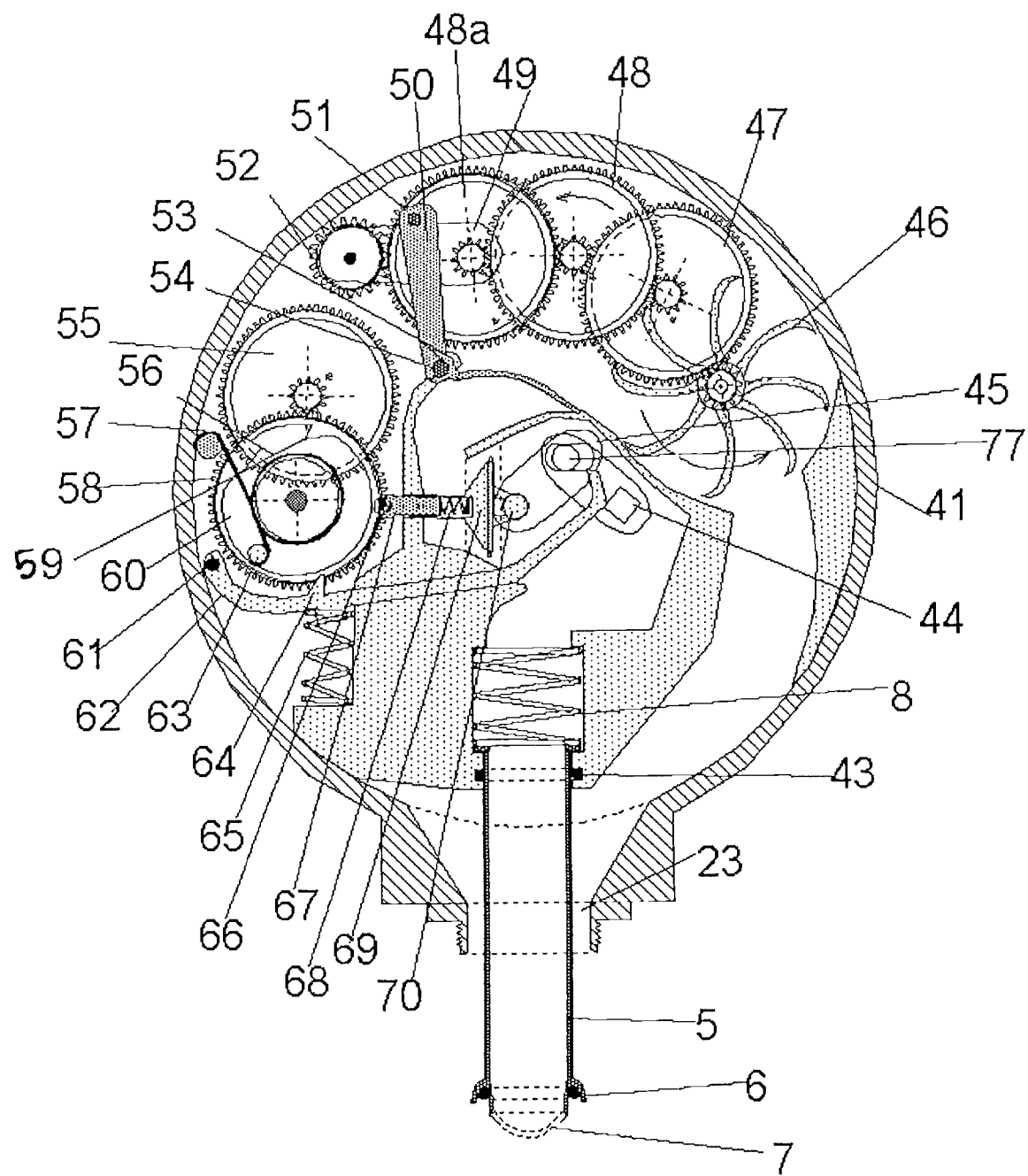
FIG. 7 illustrates a cross-sectional schematic diagram of the device shown in FIG. 6, according to various aspects of the invention.

Referring to FIG. 7, device 41 may be installed by replacing a stop mechanism of valve base 2. Water supply may pass through a strainer 7 and a pipe 5, while a spring 8 holds pipe 5 in position and an O-ring 43 provides water tightness. After passing through pipe 5, flow may activate a bracket 50 subsequent to passing through a plunger 69. Bracket 50 may rotate through an axle 54, which may be maintained in position by a spring 53. Further, bracket 50 may have a pin 51, which may moves another bracket 49 downward, so that gears 52 and 55 may be engaged. Water may then pass over an impeller 46 and exit through a pass 23, forcing rotation of impeller 46. A gear, located at a center of impeller 46, may be engaged with a set of reduction gears 47, 48, and 48a. It will be apparent, however, that a different number of gears could be used, depending on a reduction ratio desired and a volume of water allowed to pass before energizing device 41.

Clutch gear 52 may engage gear 55 as it moves downward, which may transfer kinetic motion to a gear 58. Gear 58 may have a plate cam 60, which may be connected to plunger 69 and followed by a roller 66, while also maintaining pressure to cam 60 by way of spring 68. Cam 60 may have two indentations 56 and 59, and may connect to a spring 57 via peg 63. As cam 60 rotates, roller 66 may fall into indentation 56, such that plunger 69 may close water flow through device 41. Contemporaneously, indentation 59 may engage a tooth 64 of a bracket 62, which rotates through an axle 61 to maintain a position through a spring 65. Tooth 64, being pushed by spring 65, may secure cam 60 in position, while bracket 50 may return to an original position, disengaging a clutch 52.

To reset the system, a square shaft of a handle 44 may be rotated so that a peg 77 pushes bracket 62, disengaging tooth 64 from indentation 59. By releasing cam 60, spring 57 can return cam 60 to its original position and push plunger 69 to an open position. Subsequent to system reset, handle 40 may be returned to a desired operating position, and device 41 may resume normal function. If water passing through the system remains below a maximum allowable volume, bracket 50 will return to its stop position and disengage clutch 52 from gear 55. Because indentation 59 will not reach a position of engaging tooth 64, spring 57 will return cam 60 to its original position.

In essence, as water flows, kinetic energy may be stored in spring 57 and released as water stops flowing, thus automatically resetting the system unless the volume of water reaches the maximum allowed, in which case cam 60 may lock into an "Off" position through tooth 64, at which point the system will require a manual reset.

Figure 8:
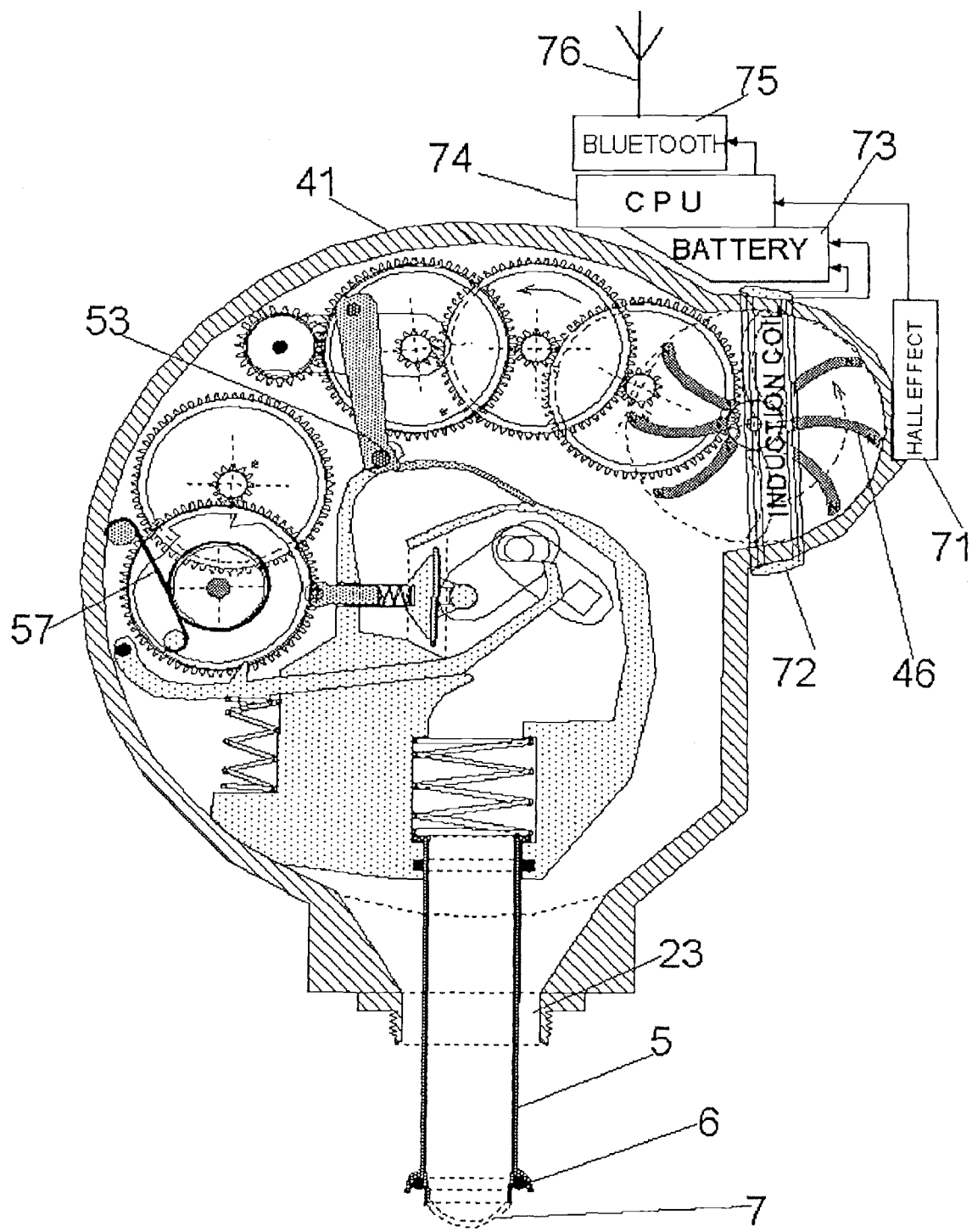
FIG. 8 illustrates a cross-sectional schematic diagram of the device shown in FIG. 6 coupled to external electronic devices, according to various aspects of the invention.

Referring to FIG. 8, an exemplary variation of the system shown in FIG. 7 is illustrated. In this illustrative example, the system may be arranged in such a way that impeller 46 may be disposed within an enclosure. In various implementations, the enclosure may be non-ferrous, as impeller 46 may be constructed using any suitably magnetic material that has been properly oriented. Accordingly, a Hall effect sensor 71 may be placed outside the non-ferrous enclosure to detect a rotation of impeller 46, and to report the rotation speed to a processor 74. Processor 74 can electronically communicate to an antenna 76 via a wireless circuit 75 (e.g., Blue Tooth™), which can therefore transmit data to a master dispatching system (e.g., to a utility company for billing). It will be apparent, however, that hard-wired circuitry may be used, or any other suitable communication mechanism may be suitably substituted, without departing from the scope and spirit of the invention.

Further, the implementation shown in FIG. 8 may harness energy created by rotation of magnets of impeller 46. This energy may be used by any appropriate circuitry (e.g., an inductor coil) to charge a battery 73. Furthermore, because mechanical/hydraulic components may be completely separate from electrical components, the system can operate in either an entirely mechanical mode, or a mechanical/electrical mode. For instance, by attaching appropriate electronic components, the system can be connected to existing alarm systems and many other electronic home controlling and improvement systems. By contrast, these electrical components may be removed and the system may be used simply to provide additional supply lines, or in other ways. Among other things, a unique benefit of the illustrated system may be an ability to wirelessly connect to existing alarm control systems, thus eliminating a need to run wires through an establishment to operate sensors, charge batteries, or otherwise, thereby avoiding costly labor and installation time.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it is understood that it is within the knowledge of one skilled in the art to effect such feature, structure, or characteristic in connection with other aspects or implementations whether or not explicitly described. Further, in describing representative aspects or implementations of the invention, various methods and/or processes may be described as a particular sequence of steps. However, the methods or processes may not necessarily rely on the particular order of steps set forth or described herein, such that the methods or processes should not be limited to the particular sequences of steps described. Moreover, claims directed to the methods and/or processes of the invention should not be limited to performing the steps in the order written, as it will be apparent that the sequences or steps may vary within the spirit and scope of the invention. Many variations and modifications of the aspects and implementations described herein will be apparent in light of the above disclosure. Accordingly, the specification and drawings are to be regarded as exemplary only, and the scope of the invention to be determined solely by the appended claims.

What is claimed is:

1. A method for creating a secondary supply line without severing a primary supply line, the primary supply line having a stop valve controlled by a stop mechanism, the method comprising:

accessing the primary supply line by removing the stop mechanism to create a stop valve opening, wherein a tapping device has an aperture for receiving the removed stop mechanism; and creating the secondary supply line by attaching the tapping device to the stop valve opening, the tapping device arranged to control the primary supply line and the secondary supply line using the received stop mechanism, wherein the tapping device has an inlet where the accessed primary supply line enters the tapping device and at least one outlet where the accessed primary supply line exits the tapping device.

2. The method of claim 1, the tapping device further arranged to maintain separation between the inlet where the accessed primary supply line enters the tapping device and the at least one outlet where the accessed primary supply line exits the tapping device.

3. The method of claim 2, wherein the tapping device attaches to a base of the stop valve to maintain the separation between the inlet and the at least one outlet.

4. A method for creating a secondary supply line without severing a primary supply line, the primary supply line having a stop valve controlled by a stop mechanism, the method comprising:

accessing the primary supply line by removing the stop mechanism to create a stop valve opening;

creating the secondary supply line by attaching a tapping device to the stop valve opening, the tapping device having an inlet where the accessed primary supply line enters the tapping device, and at least one outlet where the accessed primary supply line exits the tapping device;

measuring flow through the tapping device; and automatically stopping the flow in at least one of the primary supply line or the secondary supply line in response to the measured flow through the tapping device exceeding a predetermined threshold.

5. The method of claim 4, the predetermined threshold being configurable by a user.

6. The method of claim 4, further comprising resetting the tapping device in response to a manual turning of a handle coupled to the tapping device into a predetermined position, wherein the manual turning of the handle into the predetermined position resumes the flow through the tapping device.

7. A method for creating a secondary supply line without severing a primary supply line, the primary supply line having a stop valve controlled by a stop mechanism, the method comprising:

accessing the primary supply line by removing the stop mechanism to create a stop valve opening;

creating the secondary supply line by attaching a tapping device to the stop valve opening, the tapping device having an inlet where the accessed primary supply line enters the tapping device, and at least one outlet where the accessed primary supply line exits the tapping device; and generating electricity using kinetic motion within the tapping device.

8. The method of claim 7, the tapping device having external electrical components isolated from internal components that contact liquid.

9. The method of claim 7, further comprising charging a battery using the generated electricity.

10. The method of claim 9, the charged battery being arranged to supply energy for a circuit.

11. The method of claim 10, the circuit being arranged to exchange data with a security alarm system.

12. The method of claim 10, the circuit being arranged to exchange data with a utility company billing system.

13. The method of claim 7, further comprising measuring flow through the tapping device from the electricity generated using the kinetic motion within the tapping device.

14. A device for creating a secondary supply line without severing a primary supply line, comprising:

an inlet where flow from the primary supply line enters the device, the inlet including an attachment mechanism suitable for attaching the device to a stop valve of the primary supply line;

an outlet where the flow entering the device from the inlet exits the device; and a rotating impeller that generates kinetic energy as the flow passes through the device, wherein the flow passing through the device includes the flow entering the device from the inlet and exiting the device through the outlet.

15. The device of claim 14, the rotating impeller including a magnetic material capable of triggering a sensor positioned external to the device.

16. The device of claim 14, further comprising a chargeable device for storing the generated kinetic energy.

17. The device of claim 16, the chargeable device being a battery, the device further comprising an induction coil capable of inducing the generated kinetic energy to charge the battery.

18. The device of claim 14, further comprising a measuring mechanism for measuring the flow through the device from the kinetic energy generated as the flow passes through the device.

19. A device for creating a secondary supply line without severing a primary supply line, comprising:

an inlet where flow from the primary supply line enters the device, the inlet including an attachment mechanism suitable for attaching the device to a stop valve of the primary supply line;

an outlet where the flow entering the device from the inlet exits the device;

a measuring mechanism for measuring the flow through the device; and a stop mechanism for automatically stopping the flow in at least one of the primary supply line or the secondary supply line in response to the measured flow through the device exceeding a predetermined threshold.

20. The device of claim 19, further comprising an external control mechanism for enabling a user to specify the predetermined threshold.

21. The device of claim 19, further comprising a display mechanism for displaying an amount of the flow measured over a lifetime of the device.

22. The device of claim 19, further comprising a display mechanism for displaying an amount of the flow measured during a current use of the device.

23. The device of claim 19, further comprising an external control mechanism for regulating the flow through the device.

24. The device of claim 19, further comprising a handle that resets the tapping device in response to a manual turning of the handle into a predetermined position, wherein the manual turning of the handle into the predetermined position resumes the flow through the tapping device.

25. A device for creating a secondary supply line without severing a primary supply line, the device comprising:

an inlet where flow from the primary supply line enters the device, the inlet including an attachment mechanism suitable for attaching the device to a stop valve of the primary supply line;

an outlet where the flow entering the device from the primary supply line exits the device; and a communication mechanism for exchanging data between the device and an external system.

26. The device of claim 25, the external system being a security alarm system.

27. The device of claim 25, the external system being a utility company billing system.

28. The device of claim 25, further comprising a measuring mechanism for measuring the flow through the device, wherein the data that the communication mechanism exchanges with the external system includes the measured flow through the device.

* * * * *